United States Patent
Kim et al.

(10) Patent No.: US 9,917,537 B2
(45) Date of Patent: Mar. 13, 2018

(54) SYSTEM AND METHOD FOR CONTROLLING AN ELECTRIC MOTOR

(71) Applicant: Ford Global Technologies, LLC, Dearborn, MI (US)

(72) Inventors: Hongrae Kim, Novi, MI (US); Michael W. Degner, Novi, MI (US); William Reynolds, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 14/502,130

(22) Filed: Sep. 30, 2014

(65) Prior Publication Data
US 2015/0054433 A1   Feb. 26, 2015

Related U.S. Application Data

(63) Continuation of application No. 12/212,021, filed on Sep. 17, 2008, now abandoned.

(51) Int. Cl.
*H02P 6/00* (2016.01)
*H02P 6/34* (2016.01)
*H02P 6/28* (2016.01)

(52) U.S. Cl.
CPC ............... *H02P 6/002* (2013.01); *H02P 6/28* (2016.02); *H02P 6/34* (2016.02)

(58) Field of Classification Search
CPC .................................. H02P 6/00; H02P 6/002
USPC ............................... 318/400.02, 400.01, 700
See application file for complete search history.

(56) References Cited

U.S. PATENT DOCUMENTS

| | | | |
|---|---|---|---|
| 4,649,331 A | 3/1987 | Jahns | |
| 5,032,771 A * | 7/1991 | Kerkman | H02P 21/09 318/52 |
| 5,656,911 A | 8/1997 | Nakayama et al. | |
| 5,923,728 A | 7/1999 | Ikkai et al. | |
| 6,288,515 B1 | 9/2001 | Hiti et al. | |
| 6,362,586 B1 * | 3/2002 | Naidu | B60L 15/025 318/432 |
| 6,407,531 B1 | 6/2002 | Walters et al. | |
| 6,429,620 B2 | 8/2002 | Nakazawa | |
| 6,741,060 B2 | 5/2004 | Krefta et al. | |
| 6,894,454 B2 | 5/2005 | Patel et al. | |
| 7,065,437 B2 | 6/2006 | Mir et al. | |

(Continued)

FOREIGN PATENT DOCUMENTS

EP   1729407 A1 * 12/2006  .......... H02P 21/0089

*Primary Examiner* — Kawing Chan
(74) *Attorney, Agent, or Firm* — David B. Kelley; Brooks Kushman P.C.

(57) ABSTRACT

A method for controlling an electric motor includes receiving a first control command that is indicative of a desired motor control. A current operating condition for the motor is determined. It is then determined whether the first control command meets at least one predetermined criterion at the current operating condition. A second control command that is different from the first control command is generated when the first control command meets the at least one predetermined criterion. Generating the second control command includes determining a current value of a motor parameter, changing the parameter value, and using the changed parameter value to generate the second control command. The second control command is then used to control the motor.

15 Claims, 4 Drawing Sheets

(56) References Cited

U.S. PATENT DOCUMENTS

| | | | |
|---|---|---|---|
| 7,586,286 B2 | 9/2009 | Cheng et al. | |
| 7,592,765 B2 | 9/2009 | Rahman et al. | |
| 7,759,886 B2 | 7/2010 | Gallegos-Lopez et al. | |
| 7,845,459 B2* | 12/2010 | Kasai | B62D 5/046 180/407 |
| 8,285,451 B2* | 10/2012 | Ta | B62D 5/046 180/446 |
| 2003/0222612 A1* | 12/2003 | Matsushita | B62D 5/0487 318/437 |
| 2004/0007997 A1 | 1/2004 | Fu | |
| 2004/0100221 A1* | 5/2004 | Fu | H02P 25/03 318/700 |
| 2005/0046369 A1* | 3/2005 | Kobayashi | B60L 15/025 318/432 |
| 2006/0055363 A1 | 3/2006 | Patel et al. | |
| 2006/0181239 A1 | 8/2006 | Galli et al. | |
| 2006/0261765 A1* | 11/2006 | Prasanna | H02K 49/046 318/400.01 |
| 2007/0035269 A1 | 2/2007 | Tobari et al. | |
| 2007/0250233 A1* | 10/2007 | Nagase | B62D 5/046 701/41 |
| 2008/0315802 A1* | 12/2008 | Ueda | B66B 1/308 318/3 |
| 2011/0241578 A1* | 10/2011 | Kim | H02P 21/14 318/400.02 |
| 2011/0241585 A1* | 10/2011 | Naruse | H02M 7/53875 318/400.09 |
| 2013/0002174 A1* | 1/2013 | Okamura | B60L 15/08 318/139 |
| 2014/0203754 A1* | 7/2014 | Bhangu | H02P 23/009 318/702 |

\* cited by examiner

SYSTEM AND METHOD FOR CONTROLLING AN ELECTRIC MOTOR

CROSS-REFERENCE TO RELATED APPLICATIONS

This application is a continuation of U.S. application Ser. No. 12/212,021 filed 17 Sep. 2008, which is hereby incorporated by reference herein.

BACKGROUND

1. Field of the Invention

Embodiments of the present invention relate to controlling an electric motor.

SUMMARY

At least one embodiment of the present invention takes the form of a method for controlling an electric motor. The method includes receiving a first control command indicative of a desired motor control; this may be, for example, a desired motor speed, motor torque, or motor power. A current operating condition, such as a current motor speed or motor torque, is determined for the motor. It is determined whether the first control command meets at least one predetermined criterion at the current operating condition. Such a predetermined criterion or criteria may include, for example, whether a mathematical combination of voltage signals is above or below some predetermined value, or whether the motor is operating in a flux weakening state. A second control command that is different from the first control command is generated when the first control command meets the at least one predetermined criterion. The step of generating a second control command includes determining a current value of a motor parameter, changing the value of the parameter—e.g., by increasing it or decreasing it—and using the increased parameter value to generate the second control command. The second control command is then used to control the motor.

BRIEF DESCRIPTION OF THE DRAWINGS

Several embodiments of the present invention may be understood by referring to the following Detailed Description in conjunction with the accompanying figures, in which.

The figures are not necessarily to scale and may be simplified for clarity.

DETAILED DESCRIPTION

Figure 1:
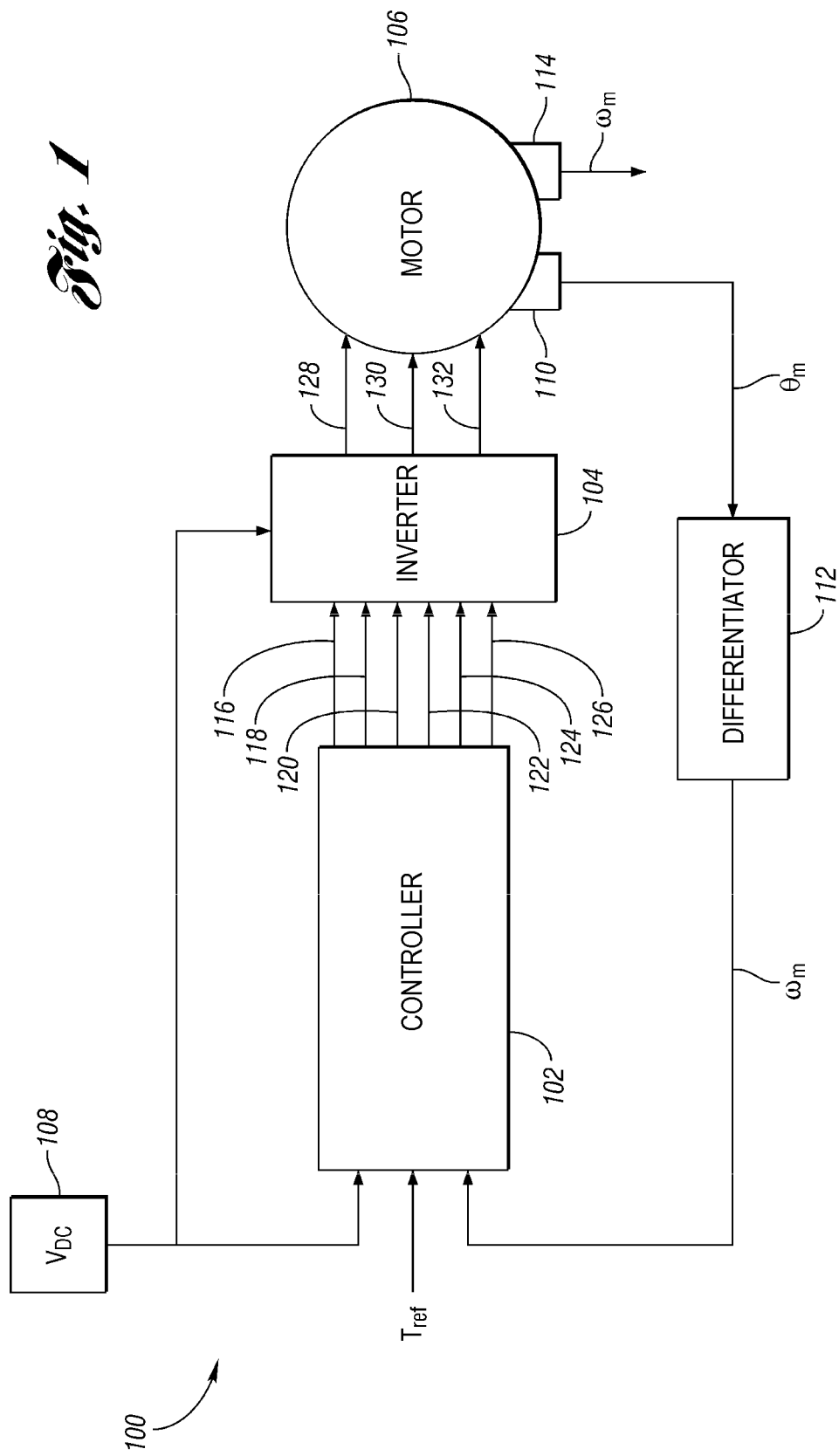
FIG. 1 is a schematic view of a system in which one or more embodiments of the present invention may operate.

FIG. 1 is a schematic view of a system 100 in which one or more embodiments of the present invention may operate. Such a system may be used, for example, in an electric or hybrid-electric vehicle. The system 100 includes a controller 102, an inverter 104, a motor 106, and a power source 108, which may be, for example, a battery, capacitor, or other source of electrical power, such as a fuel cell. Although not shown, a power source, such as the power source 108 may include suitable power interface circuitry for various functions, including, for example, signal conditioning, impedance matching, and power conversion.

The controller 102 controls the motor 106 to achieve a desired motor control parameter, such as motor speed, torque, or power. In the embodiment shown in FIG. 1, the controller 102 controls the motor 106 to achieve a desired motor torque ($T_{ref}$). When used in a motor vehicle, the system 100 may have the desired motor control parameter generated by a vehicle operator via actuation of an accelerator pedal. The system 100 may include additional controllers (not shown) on which the apparatus and functionality described below may be distributed—i.e., the controller 102 may reside in a single hardware device, or the controller 102 may be made up of a number of different hardware devices at least some of which communicate with at least some of the other hardware devices, for example, via a controller area network (CAN).

The controller 102 also receives an input motor-speed signal $\omega_m$. The motor-speed signal $\omega_m$ may be measured or calculated as described below. For example, the motor may have a position encoder 110 through which the change of the motor position $\theta$ can be measured over a prescribed time interval. A differentiator 112 can determine the derivative of the motor position $\theta$ from the equation $\omega_m = \Delta\theta/\Delta t$, where $\Delta t$ is the sampling time and $\Delta\theta$ is the change in position during the sampling time. Alternatively, a speed measuring circuit 114 may be used to directly measure the speed of the rotor and provide a motor speed signal $\omega_m$ to the controller. Other embodiments may include an observer, an estimator, or a filter to provide a value that is indicative of motor speed to the controller 102.

In the embodiment shown in FIG. 1, the controller 102 provides six gate signals: 116, 118, 120, 122, 124, 126 to the inverter 104. The gate signals 116-126 may be respectively designated as: SaH, SaL, SbH, SbL, ScH, and ScL. In these labels, the letter "S" stands for a switch position, which will be on or off—i.e., a zero or one in binary code—the "a, b, c" letters identify one of the three phases in the signal, and "H" and "L" represent high and low values, respectively. The inverter 104 receives the gate signals 116-126 as inputs, and outputs signals 128, 130, 132. The output signals 128, 130, 132 may be, for example, voltage or current signals, one for each phase of the three-phase motor 106. It is understood that an inverter, such as the inverter 104 can generate more or fewer than three signals to a motor, depending on the motor and system in which it operates. In the embodiment shown in FIG. 1, the motor 106 is an interior permanent-magnet synchronous motor such as, for example, one in a motor vehicle. The disclosed embodiments may operate in various types of vehicles that employ motor-control systems. While a preferred embodiment is shown and described by reference to a vehicle motor-control system, embodiments of the invention are not limited to vehicles, and may be applied to other motor-control systems employing electronic motor control In order to perform the prescribed functions and desired processing, the controller 102 may include a processor, memory, storage, timing apparatus, communication apparatus, input/output apparatus, and combinations of the foregoing. For example, the controller 102 may include signal filtering apparatus to enable accurate sampling, conversion, or acquisition of such signals from communication interfaces. The controller 102 may include, or be implemented with, various processors, controllers, microcontrollers, logic/gate arrays, programmable logic arrays, and combinations of the foregoing. Additional features of the controller 102 are discussed below.

Figure 2A:
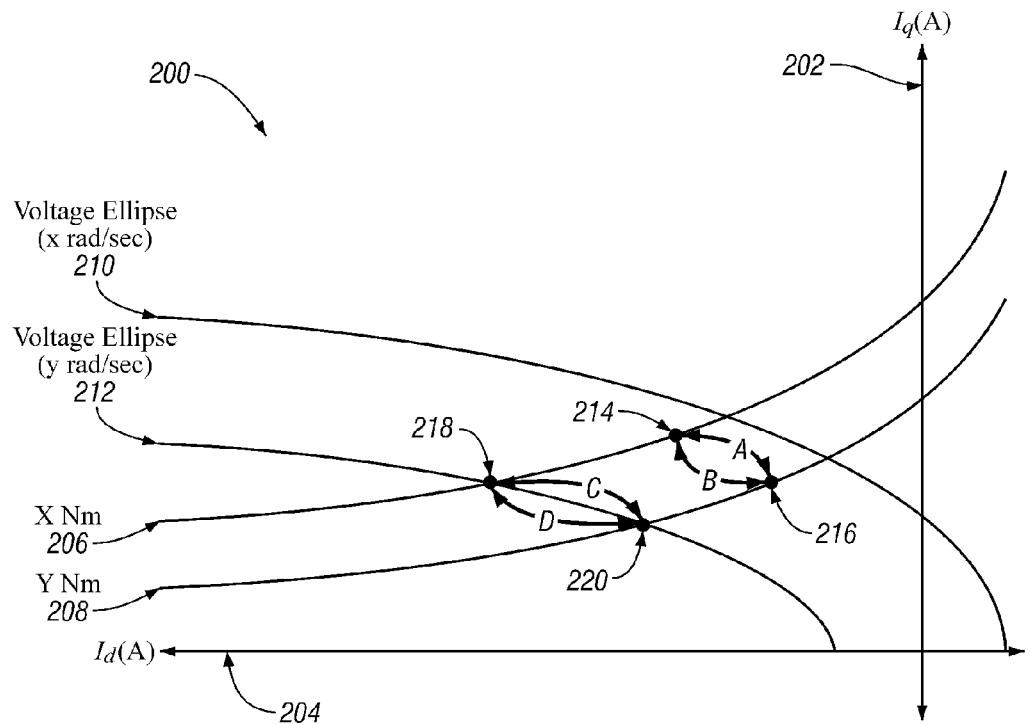
FIG. 2A is a graph that illustrates a d-q current coordinate system for torque command changes at a given speed.

FIG. 2A is a graph 200 of a d-q coordinate system that shows torque-command changes at a given speed for the motor 106. The d-q coordinate system rotates synchronously with the magnetic flux generated by a permanent magnet (not shown) of the motor 106. The d-axis is along the magnetic flux direction, and the q-axis is perpendicular to the d-axis. In the graph 200, the vertical axis 202 represents electrical current along the q-axis, and the horizontal axis 204 represents electrical current along the d-axis. The graph 200 characterizes the motor 106 as a torque-control motor. In other embodiments, however, the motor can have another controlled parameter, such as speed or power.

In the graph 200, d-q electrical current pairs that correspond to a desired torque value (X Nm) form a torque curve 206. The d-q electrical current pairs that correspond to a first speed (e.g., x rad/sec) form a voltage ellipse 210, which represents an operating boundary of the motor 106 at the first speed. The current pairs that correspond to a second speed (e.g., y rad/sec) form another voltage ellipse 212, which represents an operating boundary of the motor 106 at the second speed.

A current-command trajectory is a shift in a motor operating condition. In FIG. 2A, current-command trajectories A and B represent a shift between operating points 214 and 216 and, specifically, from a first torque (X Nm) to a second torque (Y Nm), or vice-versa, for a first speed (x rad/sec). Likewise, current-command trajectories C and D represent a shift between operating points 218 and 220, specifically from X Nm to Y Nm, or vice versa, at a second speed (y rad/sec). A current command trajectory is said to be realizable if it resides within the voltage ellipse representing the present operating boundary. For example, at a speed x rad/sec, trajectories A and B are both realizable, since they reside within voltage ellipse 210. At a speed y rad/sec, trajectory D is realizable, but trajectory C is not, since trajectory C resides outside of voltage ellipse 212. Operation of the motor 106 along current-command trajectory C can lead to an undesirable transient response.

Figure 2B:
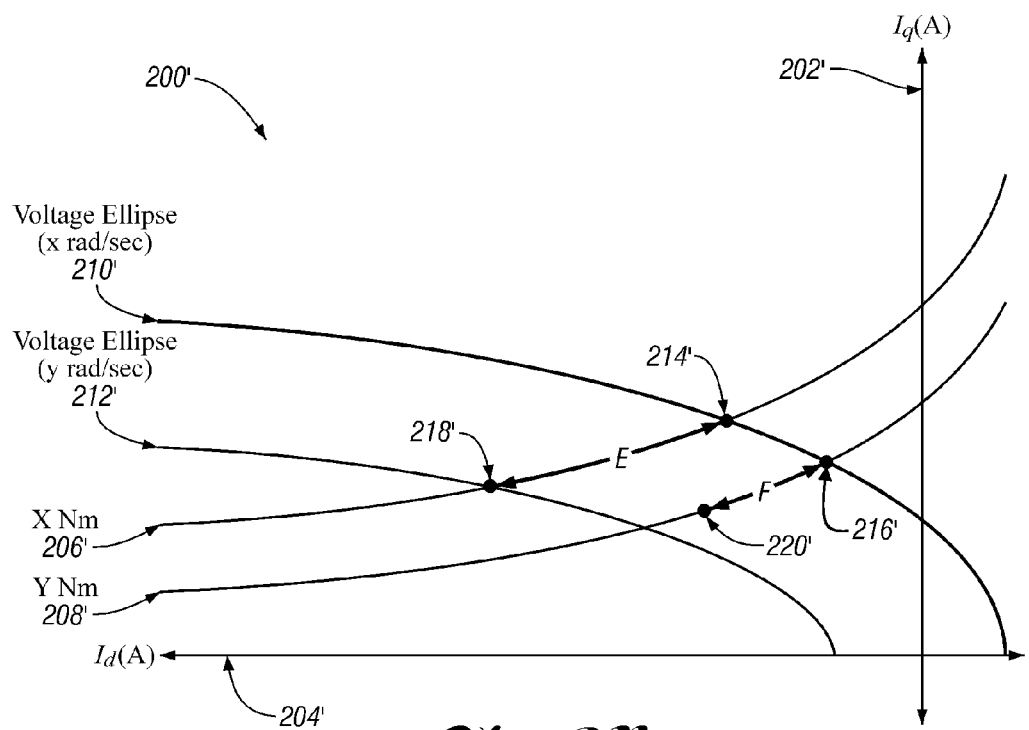
FIG. 2B is a graph that illustrates a d-q current coordinate system for speed command changes at a given torque.

FIG. 2B is a graph 200' of a d-q coordinate system that shows speed-command changes for a given torque. Here, trajectory E represents a shift between operating points 214' and 218', specifically from the first speed (x rad/sec) to the second speed (y rad/sec), or vice versa, at the first torque (X Nm). Trajectory F represents a shift between operating points 216' and 220', specifically from x rad/sec to y rad/sec, or vice versa, at Y Nm. In trajectory F, shifting from operating point 216' to operating point 220' results in operating point 220' residing outside of the voltage ellipse 212'. Hence, trajectory F is not realizable and can lead to an undesirable transient response.

Such transient responses can result from manufacturing non-idealities of the motor 106. Examples of manufacturing non-idealities include, but are not limited to, inaccurate calibration of look-up tables in the controller 102, external noise, and transmission-line losses. These non-idealities can occur more frequently at higher speeds at which the motor 106 is in a field-weakened state. At least one embodiment of the present invention can mitigate or prevent such a transient response in the motor 106. The following disclosure describes a controller embodiment and a method embodiment.

Figure 3:
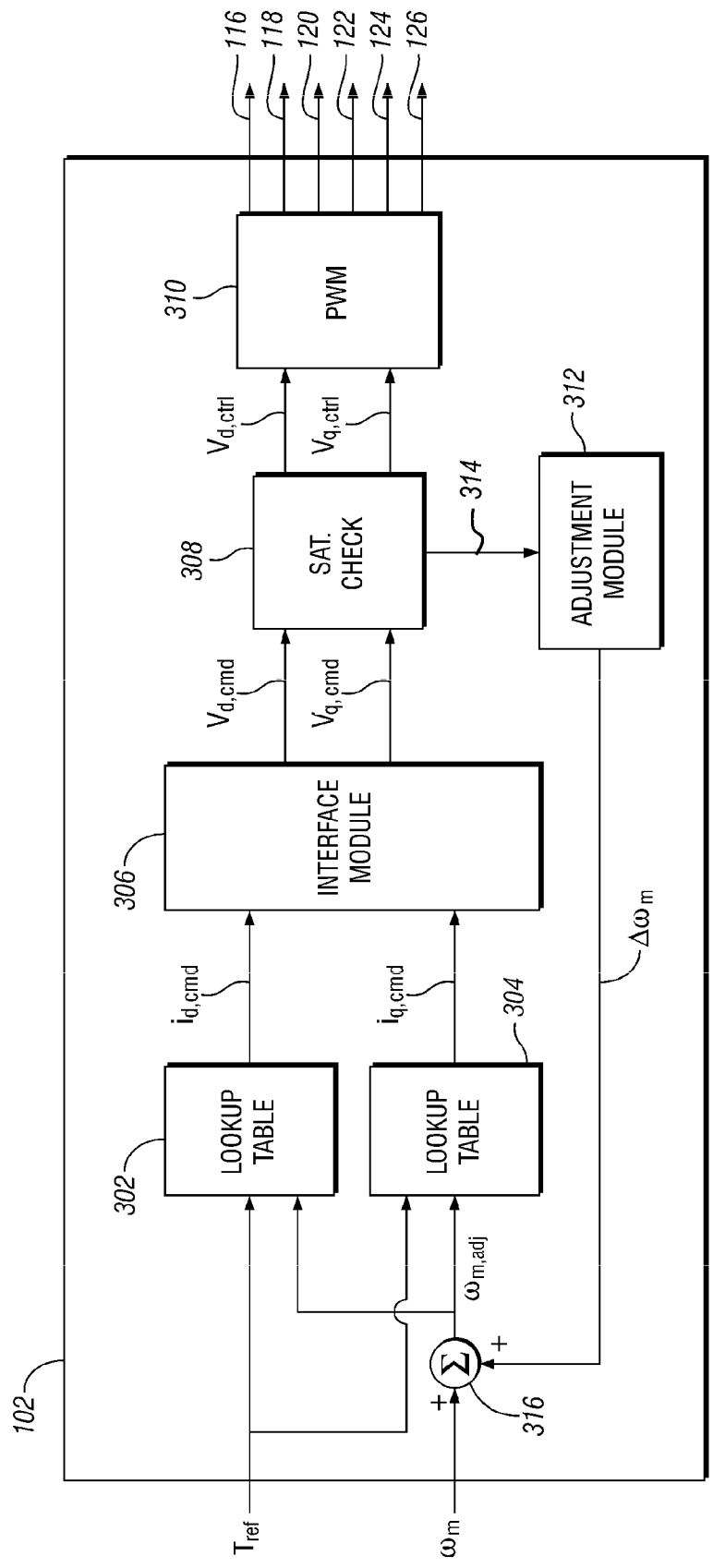
FIG. 3 is a schematic view of a controller according to an embodiment of the present invention.

FIG. 3 shows details of the controller 102 according to an embodiment of the present invention. The controller 102 has two lookup tables 302, 304 configured in parallel, an interface module 306, a check module, or saturation-check module 308, a pulse width modulator 310, and an adjustment module 312. The controller 102 is configured with the assumption that the controlled motor 106 (FIG. 1) is a torque-control motor; however, the controller 102 can be suitably modified to control other motor parameters, such as speed or power. The controller 102 may include a different number of lookup tables, interface modules, saturation-check modules, pulse width modulators, and adjustment modules, and in general, may include other hardware not shown here.

The lookup tables 302, 304 each receive the input torque signal $T_{ref}$ and a modified speed signal $\omega_{m,adj}$. The torque signal $T_{ref}$ is one example of a signal indicative of a desired motor control. The modified speed signal $\omega_{m,adj}$ is a summation of the input speed signal $\omega_m$ and an incremental speed signal $\Delta\omega_m$ output by the adjustment module 312. When the motor parameter being used in the controller 102 is a motor speed—as illustrated in FIG. 3—the output from the adjustment module 312 will be positive. Thus, the modified speed signal, $\omega_{m,adj}$, will be greater than the input speed signal $\omega_m$. In other embodiments, where the motor parameter being used is not speed—e.g., it is a motor torque—the output from the adjustment module 312 may be negative, and the modified signal will be less than the input signal. Based on one or more of the input torque signal $T_{ref}$ and the modified speed signal $\omega_{m,adj}$, the lookup tables 302, 304 can generate a d-q current command pair that includes a d-axis electrical current id,cmd and a q-axis electrical current iq,cmd. The electrical currents id,cmd and $i_{q,cmd}$ serve as inputs to the interface module 306, which functions as a current-to-voltage converter and accordingly converts $i_{d,cmd}$ and $i_{q,cmd}$ to respective voltages $v_{d,cmd}$ and $V_{q,cmd}$.

The saturation-check module 308 receives $v_{d,cmd}$ and $v_{q,cmd}$, and determines if a combination of $v_{d,cmd}$ and $v_{q,cmd}$ exceeds a predetermined value, a condition that is indicative of "saturation." If a mathematical combination of $v_{d,cmd}$ and $v_{q,cmd}$ exceeds the predetermined value, the saturation-check module 308 can provide a signal 314 to the adjustment module 312 indicating saturation. Otherwise, the saturation-check module can pass the voltage commands as voltage control signals $v_{d,ctrl}$ and $v_{q,ctr}$ to the pulse width modulator 310, which generates the gate signals 116-126.

The adjustment module 312 can receive the signal from the saturation-check module 308 indicating saturation and provide an incremental speed signal $\Delta\omega_m$ to a summing apparatus 316. Although it is shown separately, the summing apparatus may be part of the adjustment module 312. The summing apparatus 316 can sum the speed input $\omega_m$ and the incremental speed signal $\Delta\omega_m$ to generate the modified, or adjusted, speed signal $\omega_{m,adj}$ and provide the modified speed signal $\omega_{m,adj}$ to the lookup tables 302, 304.

Figure 4:
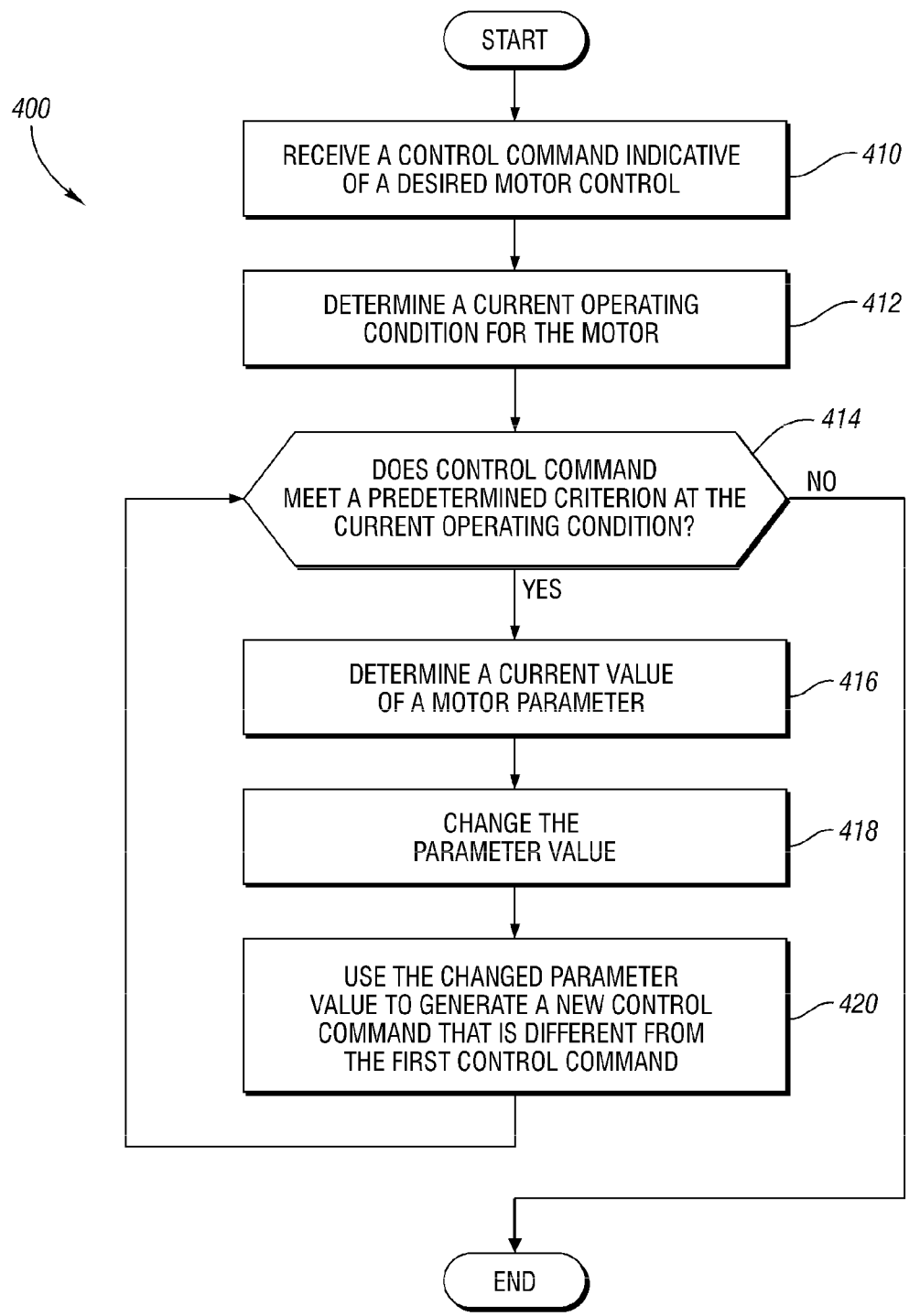
FIG. 4 is a flow diagram that illustrates a method according to an embodiment of the present invention.

FIG. 4 is a flow diagram 400 that shows a method according to an embodiment of the present invention. Although the method is explained with reference to the controller 102 (shown in FIG. 3), it is not limited to use with the controller 102.

Block 410 illustrates a step in which the saturation-check module 306 receives a control command that is indicative of a desired motor control. In the embodiment shown in FIG. 4, the desired motor control is torque and the control command is a mathematical combination of the voltages $v_{d,cmd}$ and $v_{q,cmd}$:

$$v_{cmd} = \text{sqrt}(v_{d,cmd}^2 + v_{q,cmd}^2),$$

where $v_{cmd}$ is the first voltage command, $v_{d,cmd}$ and $v_{q,cmd}$ are the voltage command values, and sqrt( . . . ) is the square-root operation.

Blocks 412 and 414 illustrate steps in which the saturation-check module 308 determines a current operating condition for the motor, and whether the control command meets a predetermined criterion at the current operating condition. This may include, for example, a determination of whether the control command at the current operating condition indicates that the motor is saturated. In some embodiments, the saturation-check module 308 checks for saturation by comparing the magnitude of the control command $v_{cmd}$ to the magnitude of a pre-determined value. If the magnitude of $v_{cmd}$ is greater than the magnitude of the predetermined value, the saturation-check module 308 transmits signal 314 to the adjustment module 312, and the method proceeds to step 416. Otherwise, the method ends with the saturation-check module 308 passing $v_{d,cmd}$ and $v_{q,cmd}$ to the pulse width modulator 310 as voltage control signals $v_{d,ctrl}$ and $v_{q,ctrl}$.

Blocks 416 and 418 illustrate steps in which the controller 102 determines a current value of a motor parameter and changes the parameter value, which, as explained above, may mean increasing or decreasing the parameter value. In the embodiment shown in FIG. 3, the motor parameter is motor speed. The adjustment module 312 receives the signal 314 indicating saturation and, in response, provides the incremental speed signal $\Delta\omega_m$ (e.g., 5 rad/sec) to the summing apparatus 316. Once the summing apparatus 316 determines the input speed signal $\omega_m$ and receives the incremental speed signal $\Delta\omega_m$, the summation module 316 can add the two signals to form an adjusted speed signal $\omega_{m,adj}$, in this example, increasing the speed value.

Block 420 illustrates a step in which the increased parameter value is used to generate a new control command that is different from the first control command. In controller 102, the lookup tables 302, 304 each receive the adjusted speed signal $\omega_{m,adj}$ and provide modified current signals to the interface module 306. The interface module 306 then generates a corresponding set of modified voltage signals, and the method returns to decision block 414. In this manner, the controller 102 can increment the motor speed value until it determines that the motor 106 is no longer in a saturated condition. The controller 102 can then supply the adjusted voltage control values that correspond to the incremented motor speed for improved-transient control.

While several embodiments of the present invention have been illustrated and described, it is not intended that these embodiments illustrate and describe all possible forms of the invention. Rather, the words used in this section are words of description rather than limitation, and various changes may be made without departing from the spirit and scope of the invention.

What is claimed is:

1. A control system for controlling an electric motor, comprising:
   a controller configured to:
      receive a voltage command indicative of a desired motor control;
      receive an input indicating a current operating condition for the motor;
      compare the voltage command to at least one predetermined criterion that indicates motor saturation at the current operating condition;
      increase the value of a motor speed when the voltage command meets the at least one predetermined criterion;
      use the changed value of the motor speed to generate a control command for controlling the motor when the voltage command meets the at least one predetermined criterion;
      use the control command to control the motor when the voltage command meets the at least one predetermined criterion; and
      use the voltage command to control the motor when the voltage command does not meet the at least one predetermined criterion.

2. The control system of claim 1, wherein the desired motor control is one of a desired operating speed, torque, or power for the motor.

3. The control system of claim 1, wherein the voltage command includes q and d components, and comparing the voltage command to the at least one predetermined criterion includes determining whether a mathematical combination of the q and d components of the voltage command is greater than a predetermined value.

4. The control system of claim 3, wherein the mathematical combination of the q and d components of the voltage command is a square root of a sum of the squares of the q and d components.

5. The controller of claim 1, wherein the control command is one of a voltage command or an electrical current command.

6. A control system for controlling an electric motor, comprising:
   a check module outputting a saturation signal only when a voltage command signal indicates motor saturation;
   an adjustment module generating a motor speed adjustment value based on the saturation signal;
   a lookup module generating a control signal for the motor based on the motor speed adjustment value; and
   a summation module using current motor speed and the motor speed adjustment value to generate adjusted motor speed.

7. The control system of claim 6, wherein the voltage command signal is indicative of one of a desired operating speed, torque, or power for the motor.

8. The control system of claim 6, wherein the lookup module comprises a lookup table that includes a series of motor parameters and a corresponding series of control signal parameters, and wherein the lookup module is configured to select a control signal parameter from the series of motor parameters based on the adjusted motor speed, and generate the control signal for the motor based on the selected control signal parameter.

9. The control system of claim 6, further comprising a processor, wherein the processor includes the check module, the adjustment module, and the lookup module.

10. A method for controlling an electric motor, comprising:
   receiving a voltage command indicative of a desired motor control;
   generating at least one of an adjusted torque command or adjusted speed command only when a comparison of the voltage command to at least one predetermined criterion indicates motor saturation at a current motor speed or a current motor torque indicates motor saturation; and
   using one of the adjusted torque command or the adjusted speed command to control the motor, and
   wherein generating at least one of the adjusted torque command or the adjusted speed command includes generating at least one of an incremental adjustment value of a motor torque or an incremental adjustment value of a motor speed, and applying the incremental adjustment value of the motor torque or the incremental adjustment value of the motor speed to a respective current torque command or current speed command.

11. The method of claim 10, wherein using one of the adjusted torque command or the adjusted speed command to control the motor includes generating at least one of a voltage signal or an electrical current signal from the adjusted torque command or the adjusted speed command, and sending one of the voltage signal or the electrical current signal to the motor.

12. The method of claim 10, further comprising using the voltage command to control the motor when the comparison of the voltage command to the predetermined criterion at the current motor speed or the current motor torque does not indicate motor saturation.

13. The method of claim 10, wherein the at least one of an incremental adjustment value of a motor torque or an incremental adjustment value of a motor speed is an incremental adjustment value of motor speed, and the incremental adjustment value of motor speed is applied to a current speed command to generate the adjusted speed command, the adjusted speed command being greater than the current speed command.

14. The method of claim 10, wherein the voltage command includes q and d components, and comparing the voltage command to at least one predetermined criterion includes determining whether a mathematical combination of the q and d components of the voltage command is greater than a predetermined value.

15. The method of claim 14, wherein the mathematical combination of the q and d components of the voltage command is a square root of a sum of the squares of the q and d components.

* * * * *